United States Patent
Ishida

(10) Patent No.: US 9,727,270 B2
(45) Date of Patent: Aug. 8, 2017

(54) DEVICE AND METHOD FOR PROCESSING PLACEMENT DATA, AND METHOD FOR LOADING AND UNLOADING ARTICLE

(71) Applicant: Hitachi, Ltd., Chiyoda-ku, Tokyo (JP)

(72) Inventor: Tomotoshi Ishida, Tokyo (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 14/783,519

(22) PCT Filed: Apr. 12, 2013

(86) PCT No.: PCT/JP2013/061031
§ 371 (c)(1),
(2) Date: Oct. 9, 2015

(87) PCT Pub. No.: WO2014/167704
PCT Pub. Date: Oct. 16, 2014

(65) Prior Publication Data
US 2016/0054923 A1 Feb. 25, 2016

(51) Int. Cl.
*G06F 3/06* (2006.01)
*G06Q 50/28* (2012.01)
*G06Q 10/08* (2012.01)

(52) U.S. Cl.
CPC ............ *G06F 3/064* (2013.01); *G06F 3/0604* (2013.01); *G06F 3/0673* (2013.01); *G06Q 10/08* (2013.01); *G06Q 50/28* (2013.01)

(58) Field of Classification Search
CPC ....... G06F 3/0604; G06F 3/0673; G06F 3/064
USPC ....................................................... 711/165
See application file for complete search history.

(56) References Cited

U.S. PATENT DOCUMENTS 8,271,497 B2* 9/2012 Ikenoue ............ G06F 17/30241
701/426

FOREIGN PATENT DOCUMENTS

| JP | 6-219518 A | 8/1994 |
| JP | 6-234423 A | 8/1994 |
| JP | 2001-142926 A | 5/2001 |
| JP | 2005-350222 A | 12/2005 |
| JP | 2012-79096 A | 4/2012 |

(Continued)

OTHER PUBLICATIONS

International Search Report (PCT/ISA/210) issued in PCT Application No. PCT/JP2013/061031 dated May 14, 2013 with English translation (three pages).

(Continued)

*Primary Examiner* — Jasmine Song
(74) *Attorney, Agent, or Firm* — Crowell & Moring LLP

(57) ABSTRACT

A device for processing placement data according to the present invention is provided with an article data memory unit that stores article data including a configuration and a storage period of an article, a storage-region data memory unit that stores storage region data including a shape of a storage region where the article is placed, a temporal-spatial map data memory unit that stores temporal-spatial map data showing positions of the article and the storage region in space-time specified by a user, and a computation device that creates the temporal-spatial map data and acquires a placement position of the article in time series in the storage region using the article data, the storage region data and the temporal-spatial map data.

2 Claims, 14 Drawing Sheets

(56) References Cited

FOREIGN PATENT DOCUMENTS

JP          2012-86984 A      5/2012

OTHER PUBLICATIONS

Onosato et al. "Mesh Modeling of Four-Dimensional Shapes" with partial English translation, Mar. 12, 2010, two pages, Graduate School of Information Science and Technology, Hokkaido University, Kita-ku, Sapporo, Japan.
Japanese Office Action issued in counterpart Japanese Application No. 2015-511044 dated Oct. 4, 2016 with machine English translation (five pages).

* cited by examiner

FIG. 3

| No | START DATE AND TIME | ENDING DATE AND TIME | COORDI-NATES 1 | COORDI-NATES 2 | COORDI-NATES 3 | COORDI-NATES 4 | COORDI-NATES 5 | ... |
|----|---------------------|----------------------|----------------|----------------|----------------|----------------|----------------|-----|
| A1 | JANUARY 1, 2012 12:00 | DECEMBER 31, 2015 17:00 | 0, 0 | 50, 0 | 50, 20 | 100, 20 | 100, 50 | 0, 50 |
| A2 | OCTOBER 31, 2012 12:00 | SEPTEMBER 30, 2013 17:00 | 100, 10 | 150, 10 | 150, 50 | 100, 50 | | |

FIG. 4
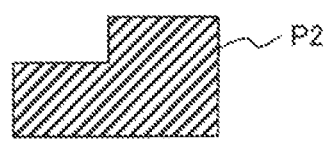
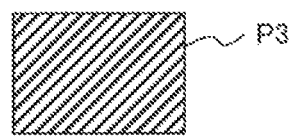

FIG. 5

| No | START DATE AND TIME | ENDING DATE AND TIME | MASS | COORDI-NATES 1 | COORDI-NATES 2 | COORDI-NATES 3 | COORDI-NATES 4 | COORDI-NATES 5 | ... | PLACEMENT SEQUENCE |
|----|---------------------|----------------------|------|----------------|----------------|----------------|----------------|----------------|-----|---------------------|
| P1 | FEBRUARY 1, 2012 12:00 | AUGUST 31, 2012 12:00 | 3 | 0, 0 | 80, 0 | 80, 20 | 0, 20 | | | 2 |
| P2 | APRIL 1, 2012 13:00 | OCTOBER 31, 2012 12:00 | 4 | 0, 0 | 50, 0 | 50, 30 | 25, 30 | 25, 20 | 0, 20 | 1 |
| P3 | OCTOBER 1, 2012 13:00 | APRIL 1, 2013 12:00 | 2 | 0, 0 | 50, 0 | 50, 30 | 0, 30 | | | 3 |

DEVICE AND METHOD FOR PROCESSING PLACEMENT DATA, AND METHOD FOR LOADING AND UNLOADING ARTICLE

FIELD OF THE INVENTION

The present invention relates to a device and a method for determining a position in which an article is to be placed in a storage region (land, a building and transportation equipment). Further, the present invention relates to a method for loading and unloading the article utilizing the determined placement position.

BACKGROUND OF THE INVENTION

When multiple articles are stored in land such as a site in which the area is finite, it is desirable to determine a placement position of each article in consideration of the facility of loading and unloading the articles and others. Further, to minimize the size of land, it is desirable to closely place articles in land. The abovementioned placement of articles is also similar in a case where articles are stored in a building such as a warehouse and in a case where articles are loaded onto transportation equipment such as a truck and a ship.

In Patent Document 1, a device that performs simulation for stuffing plural products into plural containers is disclosed. In this device, a device for stuffing the products closely is made in consideration of the weight, the size and others of the product.

In Patent Document 2, a method of displaying a change of a situation of a yard in which articles are optimally placed in an animation is disclosed. However, a concrete method of determining an optimum placement position of articles is not disclosed.

In Non-patent Document 1, a method of utilizing a four-dimensional model (time series data of a three-dimensional model) in which a time base is added to a three-dimensional configuration so as to handle the temporal variation of the three-dimensional configuration is disclosed.

DOCUMENTS ON RELATED ARTS

Patent Documents

Patent Document 1: JP 6-219518
Patent Document 2: JP 2001-142926

Non-Patent Documents

Non-patent Document 1: "Mesh Modeling of Four-Dimensional Shapes" Masahiko Onosato et al., Katachi Shure 2010 at Dazaifu on Mar. 12, 2010 of Society for Science on Form, Japan, obtained through the internet on Mar. 8, 2013 <URL: http://katachi-jp.com/shure/201003shurefukuoka/onosato.pdf>

DISCLOSURE OF THE INVENTION

Problems to be Solved by the Invention

An expert often performs work for determining the placement of each article when multiple articles are stored in a storage region (land, a building and transportation equipment) the size of which is finite. This reason is that the placement of articles that enables the reduction of costs related to loading and unloading is required to be determined in consideration of size, mass, handleability, a storage period and others for every article. Further, as the loading and unloading of articles are sequentially performed, it is essential to place another article in a vacant place where one article is already carried out and no article is placed so as to reduce area required for the storage of articles. Therefore, the placement of articles is required to be chronologically planned. Further, when a storage region is not enough, a temporary place may be utilized for a storage region for a certain period. At this time, the storage region also changes with time.

In prior methods or a method of combining these, layout drawings of plural characteristic dates such as a date immediately after articles are newly loaded and a date immediately after an available storage region changes are required to be created and the placement of articles are required to be planned, collating the respective layout drawings. Even if placement on one date is automatically determined by simulation according to prior art, it is difficult to correlate this placement and placement on another date.

The present invention is made in view of the abovementioned, and an object of the present invention is to provide a device and a method for processing placement data that is able to determine a time-series placement position of articles sequentially loaded/unloaded into/from an available storage region which changes with time according to an elapse of time. Another object of the present invention is to provide a method for loading and unloading articles efficiently.

Means for Solving the Problem

A device for processing placement data according to the present invention includes an article data memory unit that stores article data including a configuration and a storage period of an article, a storage-region data memory unit that stores storage region data including a shape of a storage region where the article is placed, a temporal-spatial map data memory unit that stores temporal-spatial map data showing positions of the article and the storage region in space-time specified by a user, and a computation device that creates the temporal-spatial map data and acquires a placement position of the article in time series in the storage region using the article data, the storage region data and the temporal-spatial map data.

Advantageous Effects of the Invention

A device and a method for processing placement data according to the present invention is able to determine a time-series placement position of articles sequentially loaded/unloaded into/from an available storage region which changes with time according to an elapse of time. The present invention also makes it possible to load and unload articles efficiently.

BRIEF DESCRIPTION OF DRAWINGS

FIG. 3 shows an example of table structure and data of storage region data;
FIG. 4 shows examples of articles;
FIG. 5 shows an example of table structure and data of article data;

DESCRIPTION OF THE PREFERRED EMBODIMENT

Figure 1:
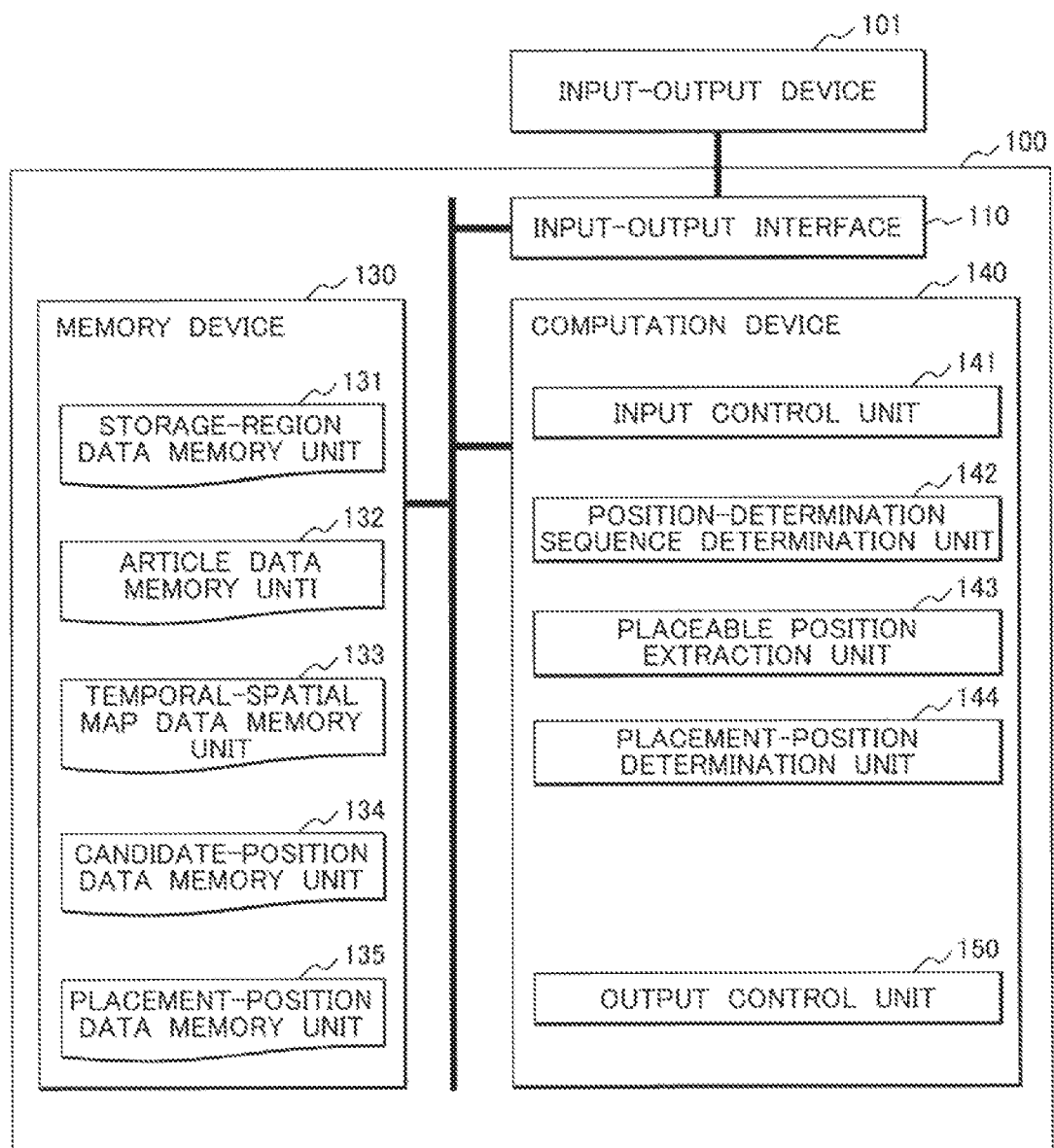
FIG. 1 is a schematic diagram showing a device and peripheral equipment for processing placement data according to a first embodiment of the present invention.

In the following description, "storage region" denotes land, a building and transportation equipment where articles are placed and stored. Further, "placement data" denotes data required for determining a position in which the articles are placed in the storage region. The placement data is time series data including an element of time.

The present invention provides a device and a method for processing placement data that enables determining a time-series placement position of articles sequentially over time loaded/unloaded into/from an available storage region which changes with time. In determining the placement position, the placement position can be determined in consideration of size, mass, handleability, a storage period and others for every article so as to reduce the cost. Further, as time series data of articles and storage regions is utilized, articles can also be placed in the storage region from which articles are unloaded and which becomes vacant. Further, the present invention provides a method of efficiently placing articles in the storage region utilizing the determined placement position, that is, a method of efficiently performing work for loading/unloading articles.

According to the present invention, it is possible to acquire the effect that work for determining a placement position of articles can be made efficient, the placement position of articles free of mutual interference can be acquired and costs related to loading and unloading can be reduced.

Referring to the drawings, embodiments of the present invention will be described below.

First Embodiment

FIG. 1 is a schematic diagram showing a placement data processing device 100 and peripheral equipment in a first embodiment of the present invention. The processing device 100 is provided with an input-output interface 110, a memory device 130 and a computation device 140, and an input-output device 101 is connected as the peripheral equipment.

The input-output device 101 inputs information such as various data and an instruction from a user and outputs a placement result of articles and others. Data input by the input-output device 101 includes placement region data representing a storage region of articles, article data representing the articles, placement condition data representing the placement order of the articles and a condition of a placement location and processing condition data representing a condition required for processing. It is desirable that the input-output device 101 is configured by a keyboard, a mouse, a display, a printer and others which are general input-output devices of a computer. However, the configuration of the input-output device is not limited to this. A user can input data and instructions to the processing device 100 using the input-output device 101.

The storage region data, the article data and the placement condition data are placement data (data required for determining a position where articles are placed in a storage region). The storage region data includes data representing a shape and an available period of a storage region. The article data includes data representing a configuration and a storage period of articles. The configuration of articles includes size, mass, handleability, a shape and others of articles. A region required for storing the articles can be determined on the basis of the configuration of the articles.

The input-output interface 110 is an interface for the processing device 100 to input and output information to/from the input-output device 101. That is, the input-output interface 110 inputs information input from the input-output device 101, transfers the information to the memory device 130 and the computation device 140, outputs data stored in the memory device 130 and a result acquired by the computation device 140, and transfers the data and the result to the input-output device 101.

The memory device 130 is a device that stores various data and is provided with the following five memory units, that is, a storage-region data memory unit 131, an article data memory unit 132, a temporal-spatial map data memory unit 133, a candidate-position data memory unit 134 and a placement-position data memory unit 135. For the memory device 130, a general storage device such as a hard disk and a flash memory can be used.

The storage-region data memory unit 131 stores storage region data input from the input-output device 101. Formats of data stored by the storage-region data memory unit 131 are not limited.

The article data memory unit 132 stores article data input from the input-output device 101. Formats of data stored by the article data memory unit 132 are not limited.

The temporal-spatial map data memory unit 133 stores temporal-spatial map data created by a placeable position extraction unit 143 described later. The temporal-spatial map data is data representing positions of an article and a storage region in space-time. In this embodiment, temporal-spatial map data is three-dimensional data including a combination of one-dimensional time and two-dimensional space and is data representing positions of an article and a storage region in three-dimensional space-time. The temporal-spatial map data may be four-dimensional data including a combination of one-dimensional time and three-dimensional space.

The candidate-position data memory unit 134 stores candidate position data created by the placeable position extraction unit 143 described later. The candidate position data is data representing a position where an article is possible to be placed, created for every article. The candidate position data has data of the number equivalent to the number of placeable positions for every article. For example, three pieces of candidate position data are stored for an article possible to be placed in three locations, and 0 (zero) pieces of candidate position data is stored for an article which cannot be placed (that is, no candidate position data is stored).

The placement-position data memory unit 135 stores placement position data created by a placement-position determination unit 144 described later. The placement position data is data representing a determined placement position of an article and is created for every article. When plural pieces of candidate position data are stored for one article in the candidate-position data memory unit 134, the placement-position determination unit 144 selects one data from among the plural pieces of candidate position data, and the placement-position data memory unit stores the selected one data as placement position data.

The computation device 140 is a device that processes information input from the input-output interface 110 and data stored in the memory device 130 and is provided with the following five processing units, that is, an input control unit 141, a position-determination sequence determination unit 142, the placeable position extraction unit 143, the placement-position determination unit 144 and an output control unit 150. For the computation device 140, a central processing unit used for a computer for example can be used.

The input control unit 141 partitions information input from the input-output device 101 into data and an instruction and others, and transfers them to respective each unit of the memory device 130 and the computation device 140. Especially, as for primary data, the input control unit transfers storage region data to the storage-region data memory unit 131 and transfers article data to the article data memory unit 132.

The position-determination sequence determination unit 142 determines sequence of an article in determining a placement position on the basis of the configuration of the article included in article data stored in the article data memory unit 132 and transfers this sequence to the article data memory unit 132 as sequence data as a postscript. In this embodiment, the sequence data is transferred to the article data memory unit 132 as a postscript so as to simplify record configuration of data. However, the sequence data may be stored in another memory unit. The present invention does not limit a memory location of the sequence data.

For the configuration of an article utilized for determining the sequence of the article in determining the placement position, size, mass and others are used. It can be determined on the basis of an instruction of a user input via the input-output interface 110 which of the configuration of the article is utilized for determining the sequence. The sequence of the article in determining the placement position can also be determined using one characteristic of the article such as sequence in larger size and sequence in larger mass and can also be determined by combining plural characteristics of the article like sequence in a larger mean value of respective indexed size and mass. The present invention does not limit how to determine sequence of an article in determining a placement position.

The placeable position extraction unit 143 sequentially searches a placeable position of the article according to the sequence determined by the position-determination sequence determination unit 142, creates candidate position data for every article, and stores it in the candidate-position data memory unit 134. The placeable position of the article means a position which is available during a storage period of the article for deciding a placement position and in which no other article is placed out of positions in a storage region. More concretely, the placeable position of the article means a position in the storage region available during the storage period of the target article and means a position which does not interfere with a position of an already placed article. "The position which does not interfere with the position of the already placed article" means a position in which no article is placed and means a position in which a part of the target article is not overlapped with a part or the whole of the already placed article.

To accelerate and facilitate the retrieval of a placeable position of an article, three-dimensional temporal-spatial map data acquired by combining one-dimensional time and two-dimensional space is utilized in this embodiment. The placeable position extraction unit creates temporal-spatial map data, stores it in the temporal-spatial map data memory unit 133, and performs such processing, sequentially updating the temporal-spatial map data. The details of the temporal-spatial map data will be described later.

The placement-position determination unit 144 acquires a placement position of an article in a storage region. Concretely, the placement-position determination unit 144 selects data of a placement position which is considered the most appropriate from among candidate position data stored in the candidate-position data memory unit 134 for every article and stores the selected placement position data in the placement-position data memory unit 135 as placement position data. When an article is stored near a gateway or near a passage in a storage region, the article can be simply moved. Therefore, for example, a position in which distance from the gateway is minimum can be selected as the most appropriate placement position of the article. A condition for determining the most appropriate placement position of an article can be determined on the basis of an instruction of a user input via the input-output interface 110 and for example, for the condition, distance from a gateway, distance from a passage, distance with a similar article stored at the same time or the combination of these can be given. The present invention does not limit a type of a condition for determining a placement position.

The output control unit 150 controls the output of data stored in each unit in the memory device 130 and transfers these data to the input-output device 101. The primary processing is outputting placement position data of each article stored in the placement-position data memory unit 135 and transferring it to the input-output device 101.

Figure 2A:
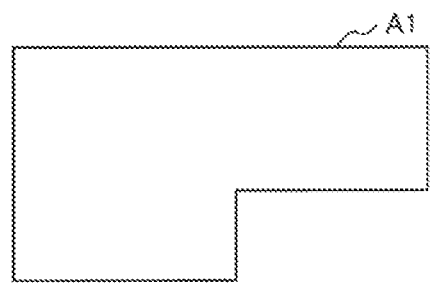
FIG. 2A shows an example of a storage region at time t1.
Figure 2B:
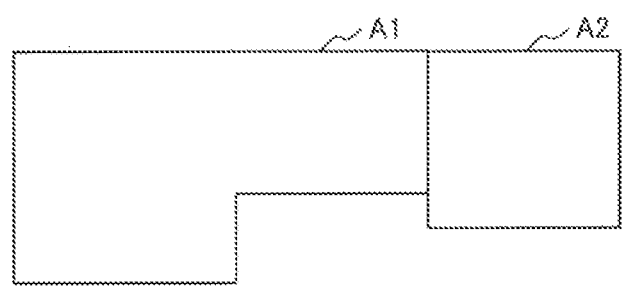
FIG. 2B shows an example of a storage region at time t5.

FIGS. 2A and 2B show examples of storage regions denoted by storage region data stored in the storage-region data memory unit 131. FIG. 2A shows the storage region at certain time t1 and FIG. 2B shows the storage region at time t5 later than the time t1.

At the time t1, the L-shaped storage region A1 shown in FIG. 2A exists and at the time t5, a storage region A2 is added to the storage region A1 as shown in FIG. 2B. In the present invention, in addition to a case where a storage region does not temporally change, a case where a storage region temporally changes and its area increases/decreases as shown in FIGS. 2A and 2B can also be handled. Further, a case where the shape of a storage region changes with time independent of the increase/decrease of the area of the storage region can also be handled. Moreover, in the example shown in FIG. 2B, the two storage regions A1, A2 are adjacent. However, in the present invention, even if storage regions are not adjacent and are mutually apart, the case can also be handled.

FIG. 3 shows an example of table structure and data of storage region data stored in the storage-region data memory unit 131. In FIG. 3, "No" denotes a symbol for identifying respective storage regions. "Start Date and time" denotes a date and time when respective storage regions become available, and "Ending Date and time" denotes a date and time when the respective storage regions become unavailable. An available period of the storage region starts at a start date and time and ends at an ending date and time. "Coordinates" denote coordinates of a point and each storage region has plural coordinates. A region available as a storage region is expressed by the region surrounded by line segments each of which is acquired by connecting points denoted by respective coordinates.

In the example shown in FIG. 3, as storage region data, simple table structure is shown. In the present invention, the structure of storage region data is not limited to such structure, and structure for dealing a storage region having a curved boundary line and a three-dimensional storage region can also be adopted.

FIG. 4 shows examples of articles stored in a storage region. In FIG. 4, three articles P1, P2, P3 are shown as articles to be stored. As the height is not required to be considered when the articles are stored in the storage region without piling them, only a plan is required for the drawings showing the articles. However, when the storage region has a roof, the height of the articles is required to be considered. Further, when plural articles are piled, the height of the article, height in which the articles can be piled and others are also required to be considered. When the height is considered as in these cases, a plan and an elevation can also be used for drawings showing the articles.

FIG. 5 shows an example of table structure and data of article data stored in the article data memory unit 132. In FIG. 5, "No" denotes a symbol for identifying respective articles. "Start Date and time" denotes a date and time when the storage of respective articles starts and "Ending Date and time" denotes a date and time when the storage of the respective articles ends. A storage period of the article starts at a start date and time and ends at an ending date and time. "Mass" denotes mass of respective articles. "Coordinates" denote coordinates of a point and each article has plural coordinates. A region required for the storage of the article denotes a region encircled by line segments each of which is acquired by connecting points shown by the coordinates. "Placement Sequence" denotes data (sequence data) showing sequence in determining placement positions of respective articles and is added to the article data by processing in the position-determination sequence determination unit 142. In the example shown in FIG. 5, the sequence in determining the placement position is determined in the order of larger mass.

In the example shown in FIG. 5, simple table structure as article data is shown. In the present invention, the structure of article data is not limited to such structure and structure for dealing with an article expressed by a three-dimensional configuration and an article having a curve and a curved surface can also be adopted. Further, as sequence data is different from the other data of the article data in a procedure for storing, the sequence data may be independently stored in a separate table from the article data.

FIGS. 6A, 6B, 6C, 6D and 6E show states in which the articles P1, P2, P3 shown in FIG. 4 are stored in the storage regions A1, A2 shown in FIGS. 2A and 2B. FIGS. 6A to 6E show time-series changes of the storage regions A1, A2 and the articles P1, P2, P3 and time goes in the order of FIGS. 6A to 6E.

Figure 6A:
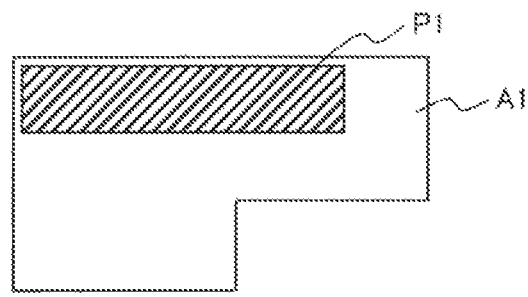
FIG. 6A shows that the article P1 is stored in the storage region A1 at time t1.
Figure 6B:
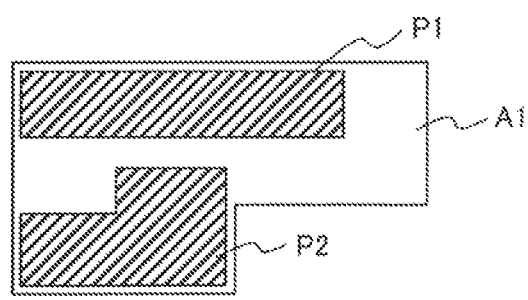
FIG. 6B shows that the article P1 and the article P2 are stored in the storage region A1 at time t2.
Figure 6C:
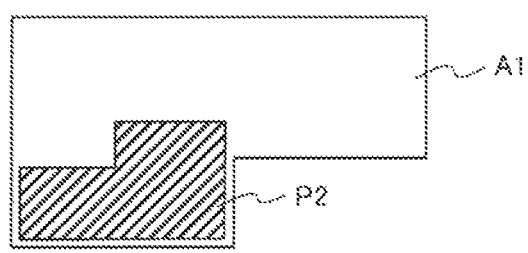
FIG. 6C shows that the article P2 is stored in the storage region A1 at time t3.
Figure 6D:
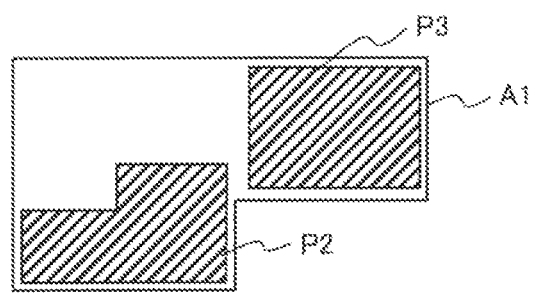
FIG. 6D shows that the article P2 and the article P3 are stored in the storage region A1 at time t4.
Figure 6E:
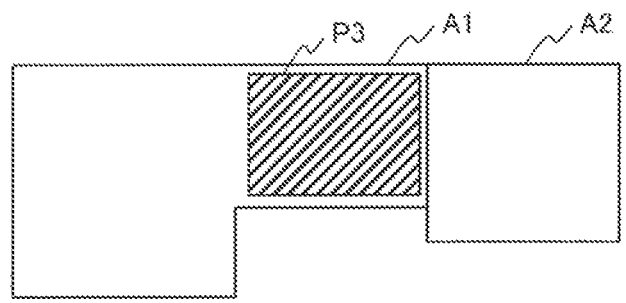
FIG. 6E shows that the article P3 is stored in the storage region A1 and the storage region A2 is added at time t5.

FIG. 6A shows that the article P1 is stored in the storage region A1 at the time t1. FIG. 6B shows that the article P1 and the article P2 are stored in the storage region A1 at time t2 later than the time t1. FIG. 6C shows that the article P1 is carried out of the storage region A1 at time t3 later than the time t2 and only the article P2 is stored in the storage region A1. FIG. 6D shows that the article P2 and the article P3 are stored in the storage region A1 at time t4 later than the time t3. FIG. 6E shows that the article P2 is carried out of the storage region A1, only the article P3 is stored in the storage region A1 and the storage region A2 is added at time t5 later than the time t4.

Figure 7:
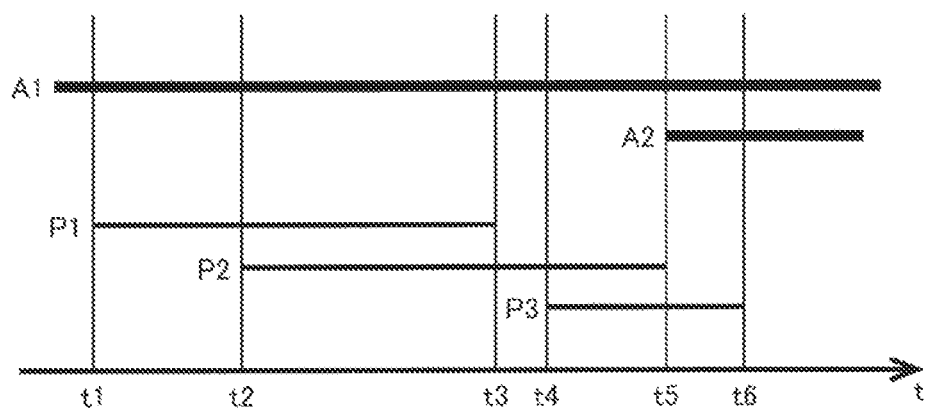
FIG. 7 shows time-series changes of the storage regions and the articles.

FIG. 7 shows time-series changes of the storage regions A1, A2 and the articles P1, P2, P3 respectively shown in FIGS. 6A to 6E. In FIG. 7, time t is shown on an axis of an abscissa, and available periods of the storage regions A1, A2 and storage periods of the articles P1, P2, P3 are expressed by straight lines parallel to the axis of the abscissa. When FIG. 7 and the FIGS. 6A to 6E are contrasted, time series correlation between the storage regions A1, A2 and the articles P1, P2, P3 is found out.

The article can be placed across two or more storage regions. For example, when the storage region is added, the article can be placed across the storage region before addition and the added storage region.

Figure 14:
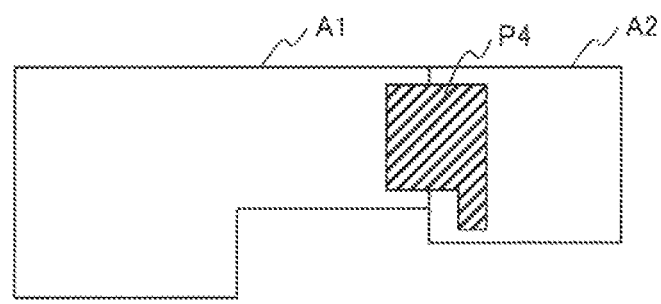
FIG. 14 shows that an article is placed across two storage regions.

FIG. 14 shows that an article P4 is placed across the two storage regions A1, A2 shown in FIG. 6E. In FIG. 6E, the storage region A2 is added to the storage region A1 and the article P4 is placed across the storage region A1 before addition and the added storage region A2.

As described above, in the device and the method for processing in this embodiment, the article can be placed in the storage region the configuration and the size of which change with time and the efficient placement of the article in which the storage region can be effectively used can be acquired.

Figure 8A:
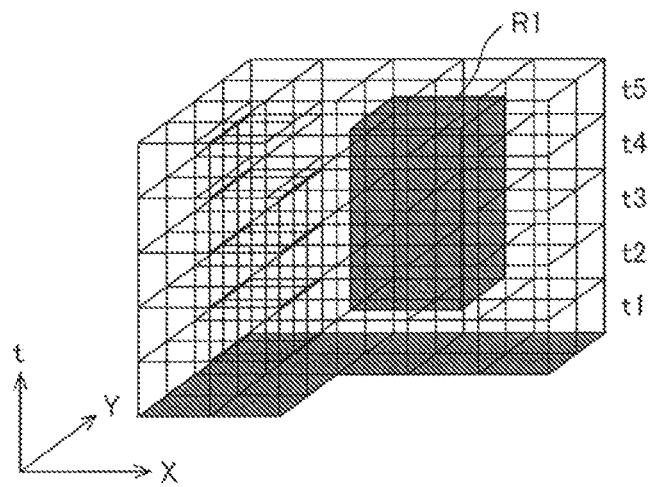
FIG. 8A shows an image of temporal-spatial map data.
Figure 8B:
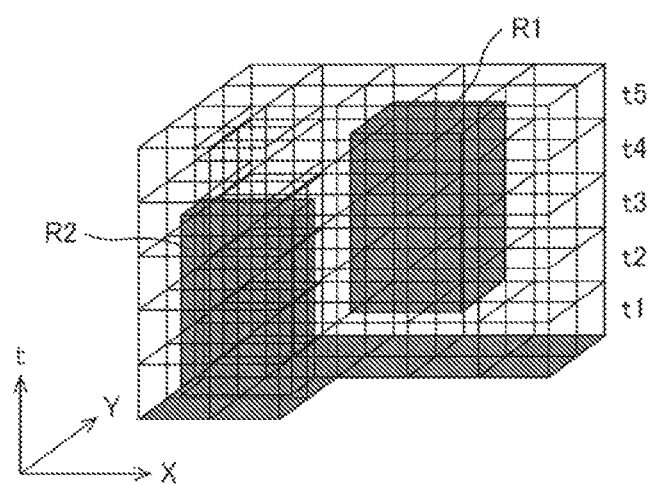
FIG. 8B shows another image of temporal-spatial map data.

FIGS. 8A and 8B express images of temporal-spatial map data stored in the temporal-spatial map data memory unit 133. In FIGS. 8A and 8B, the X-axis and the Y-axis express two-dimensional space and the t-axis expresses one-dimensional time.

The temporal-spatial map data is created by dividing space-time (computing space-time) specified by a user into plural cells (partial regions) per unit distance and per unit time. The computing space-time is space-time including all storage regions and all storage periods of articles to be stored, may be space-time having the same size as the storage region and the storage period, and may be space-time larger than the storage region and the storage period. That is, the computing space-time necessarily includes a temporal-spatial region which is the storage region and the storage period and may include a temporal-spatial region which is not the storage region and the storage period (a region which cannot be used for the storage region and a period except the storage period). A user can specify computing space-time of arbitrary size. As for unit distance such as 1 mm and 1 m, a user can arbitrarily determine it in relation with the size of the article. As for unit time such as one hour and one day, a user can arbitrarily determine in relation with the storage period of the article.

In this embodiment, the temporal-spatial map data is data of three-dimensional space configured by two-dimensional space (X, Y) and one-dimensional time (t) as shown in FIGS. 8A and 8B and is created by dividing the three-dimensional space into plural three-dimensional cells per unit distance and per unit time. In FIGS. 8A and 8B, the computing space-time is space having the same size as the storage region and the storage period of the article (that is, the computing space-time does not include a temporal-spatial region which is not the storage region and the storage period).

FIG. 8A shows that an article B1 which needs a square region for storage is stored in an L-shaped storage region only during time t2 to t5. In FIG. 8A, the X-axis and the Y-axis denote positions of the article B1, the t-axis denotes a storage period of the article B1, and space-time in which the article B1 is stored is denoted by a region R1.

FIG. 8B shows that the article B1 which requires a square region for storage is stored in the same L-shaped storage region as that shown in FIG. 8A only during time t2 to t5 and an article B2 requires a rectangular region for storage is stored only during time t1 to t4. In FIG. 8B, the X-axis and the Y-axis denote positions of the articles B1, B2, the t-axis denotes storage periods of the articles B1, B2, space-time in which the article B1 is stored is denoted by the region R1, and space-time in which the article B2 is stored is denoted by a region R2.

In FIG. 8B, when the region R1 and the region R2 interfere, the articles B1 and B2 interfere, actually, placement positions where the articles B1 and B2 cannot be placed are denoted, and when the region R1 and the region R2 do not interfere, placement positions where the articles B1 and B2 can be actually placed are denoted. Even if plural drawings different in time are created when plans shown in FIGS. 6A to 6E are utilized, interference between/among plural articles cannot be sometimes found completely. However, when the temporal-spatial map data shown in FIGS. 8A and 8B is utilized, it can be securely and easily found that plural articles do not interfere.

In this embodiment, three-dimensional array data acquired by combining time and space is stored in the temporal-spatial map data memory unit 133 utilizing the abovementioned principle and temporal-spatial map data, that is, the storage region of the article and the placement of the article are denoted by the array data. The array data is data representing cells (partial regions) acquired by dividing computing space-time specified by a user, each array of the array data corresponds to each partial region, and a value showing whether each partial region is available or not is recorded in each array by the placeable position extraction unit 143. Hereby, it can be recorded whether each cell of the temporal-spatial map data is available or not.

Concretely, it is as follows. In temporal-spatial map data, in an initial state, cells of a temporal-spatial region including a storage region and a storage period in computing space-time are available and cells except them (cells in a region unavailable for a storage region and a period which is not a storage period) are unavailable. First, one article is placed in available cells in the temporal-spatial map data and the cells in a spatial region occupied by this article and corresponding to a range of the storage period are turned unavailable. Since cells except the cells in the temporal-spatial region including the storage region and the storage period and the cells where the article is already placed are unavailable when the next article is placed, cells except these cells in the temporal-spatial map data are available. Then, a location where the next article can be placed is searched in a range of the available cells.

Figure 9:
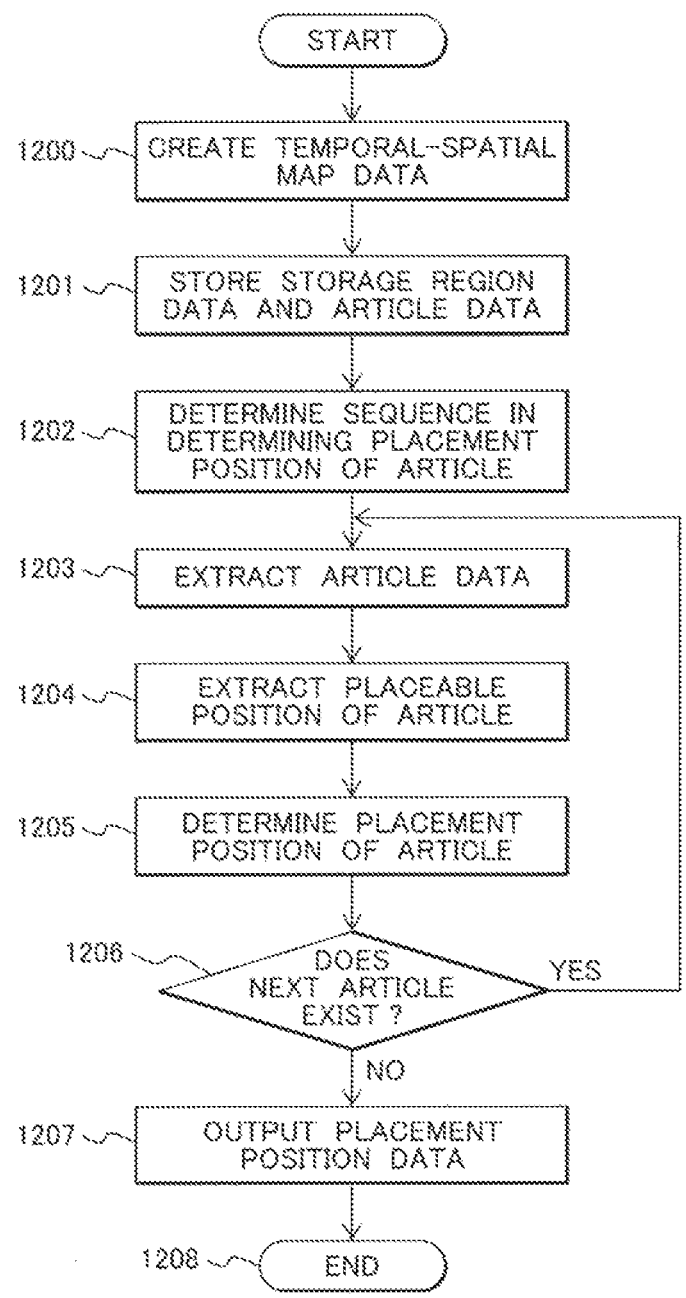
FIG. 9 is a flowchart showing a process executed by the device in the first embodiment.

Referring to FIGS. 9 and 10A to 10D, a process executed by the processing device 100 will be described below. For an example, a case where the article B1 shown in FIG. 8A and another article (an article B3) are placed in the L-shaped storage region shown in FIG. 8A will be described. FIG. 9 is a flowchart showing a process executed by the processing device 100. FIGS. 10A to 10D show temporal-spatial map data. However, as it is difficult to express the three-dimensional temporal-spatial map data in FIGS. 10A to 10D, the temporal-spatial map data is expressed by drawings in which data corresponding to FIG. 8A is decomposed into the time t1 to t5 along the t-axis showing time (a vertical direction in FIG. 8A).

In FIG. 9, in a step 1200, the placeable position extraction unit 143 creates temporal-spatial map data when the temporal-spatial map data is not stored in the temporal-spatial map data memory unit 133. When a user inputs a range of computing space-time, unit distance and unit time respectively acquired by dividing the computing space-time via the input-output device 101, the input-output interface 110 receives the data input by the user via the input-output device 101 and transfers it to the placeable position extraction unit 143. The placeable position extraction unit 143 divides the computing space-time into plural cells (partial regions) per unit distance and per unit time on the basis of the transferred data, creates temporal-spatial map data, and stores it in the temporal-spatial map data memory unit 133.

In a step 1201, when the user inputs storage region data with the input-output device 101, the input-output interface 110 reads the storage region data from the input-output device 101. The storage-region data memory unit 131 stores the storage region data read by the input-output device 101. The stored storage region data has a format shown in FIG. 3. Further, the placeable position extraction unit 143 reflects the storage region data in the temporal-spatial map data stored in the temporal-spatial map data memory unit 133 utilizing the storage region data.

Figure 10A:
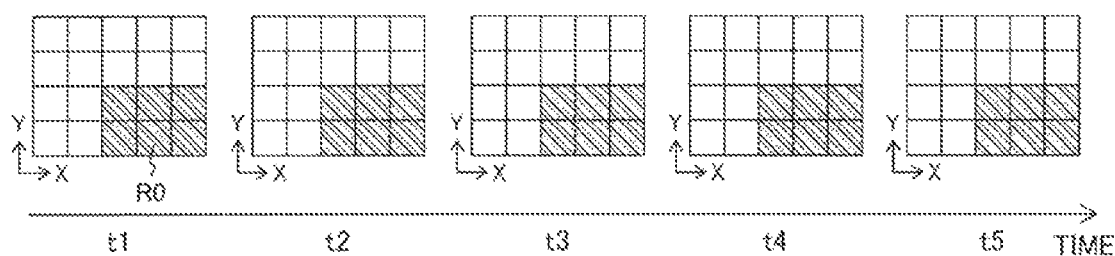
FIG. 10A shows temporal-spatial map data decomposed into the time t1 to t5 and shows a storage region.

FIG. 10A shows a storage region in the computing space-time. In FIG. 10A, a region R0 which is not included in the storage region, that is, the region R0 which is unavailable to the storage region is shown by hatching. As shown in FIG. 10A, the region R0 which is not included in the storage region is unchanged for time t1 to t5.

Further, in the step 1201, when the user inputs article data with the input-output device 101, the input-output interface 110 reads the article data from the input-output device 101. The article data memory unit 132 stores the article data read by the input-output device 101. The stored article data has a format shown in FIG. 5. However, as a value of "Placement Sequence" is undecided, the value is not stored.

Next, in a step 1202, the position-determination sequence determination unit 142 determines the sequence of an article for deciding a placement position and stores the determined sequence in the article data memory unit as sequence data. In this embodiment, as shown in FIG. 5, the sequence data is stored in a table of the article data. A process for determining the sequence of the article for deciding a placement position can be performed by a general process called sorting. For example, the sequence of the article for deciding a placement position can be determined by sorting the article using the area of the article required for storage, the mass of the article or the combination of these for a key. The key for sorting can be acquired from article data stored in the article data memory unit 132 and it can be determined on the basis of an instruction of a condition input to the processing device 100 via the input-output device 101 by a user what key is used.

Afterward, article data is extracted from the article data memory unit 132 one by one according to the sequence determined in the step 1202 and the placement position of the article is determined (steps 1203 to 1206).

In the step 1203, the placeable position extraction unit 143 extracts one article data from the article data memory unit 132 according to the sequence determined in the step 1202.

In the step 1204, the placeable position extraction unit 143 extracts a placeable location of the article extracted in the step 1203 from the computing space-time utilizing temporal-spatial map data stored in the temporal-spatial map data memory unit 133.

Figure 10B:
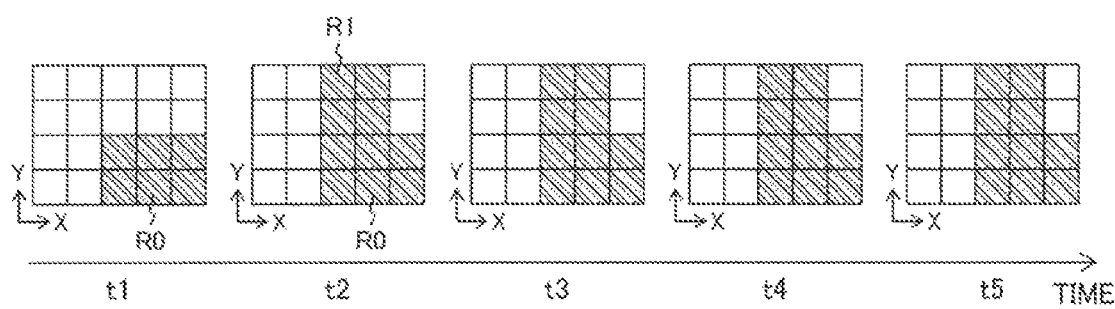
FIG. 10B shows temporal-spatial map data decomposed into the time t1 to t5 and shows a placeable position of an article.

FIG. 10B shows placeable positions of an article in the computing space-time. In FIG. 10B, the region R0 which is not included in the storage region and a region R1 in which the article B1 is stored are shown by hatching, a region in which the placement of an article is impossible is only the region R0 at time t1, and the region in which the placement of the article is impossible is the region R0 and the region R1 at time t2 to t5. At each time, regions not shown by hatching are available regions for a storage region.

Figure 10C:
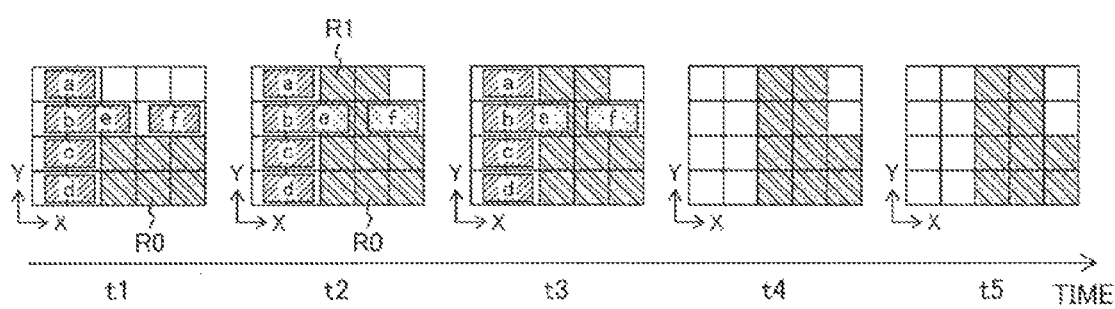
FIG. 10C shows temporal-spatial map data decomposed into the time t1 to t5 and shows a process for extracting placeable locations of articles.

FIG. 10C shows a process for extracting locations where articles are placeable in the computing space-time shown in FIG. 10B. In FIG. 10C, a case of extracting a placeable location of the article B3 that requires two cells arrayed in a direction of the X-axis for storage (such an article as the article B2 shown in FIG. 8B) is shown for an example. The article B3 shall be stored only during time t1 to t3. To place the article B3 in a storage region, it is required to be placed in a location not overlapped with the region R0 and the region R1. As a storage period of the article is specified, it cannot be changed and the placeable location of the article is extracted by moving a position of the article in the direction of the X-axis and a direction of the Y-axis in the computing space-time of the temporal-spatial map data.

In the case shown in FIG. 10C, for a candidate of placement position of the article B3, there are placement candidates a, b, c, d, e, and f. As the placement candidates a, b, c and d are not overlapped with the region R0 and the region R1 at the time t1 to t3, the article B3 can be placed there. However, since the placement candidates e and f are overlapped with the region R1 at the time t2, t3, the article B3 cannot be placed. Then, in the step 1204, the placeable position extraction unit 143 creates data representing coordinate values of the four locations a, b, c and d and stores the created data in the candidate-position data memory unit as candidate position data. A format of the candidate position data may be data representing a cell in which one point that configures an article to be placed is included and may be one coordinates that configure the article to be placed. The present invention does not limit the format of the candidate position data.

In a step 1205, the placement-position determination unit 144 selects the most appropriate position from among the candidate position data pieces stored in the candidate-position data memory unit 134 as a placement position of the article and stores coordinates of the selected position in the placement-position data memory unit 135 as placement position data. It can be determined on the basis of a condition input to the processing device via the input-output device 101 and specified by a user which position is the most appropriate. For an example of a representative condition, a condition for placing in the closest position to a gateway and a condition for placing in the closest position to another article having the same storage period can be given. In cases of such conditions, distance used on the condition for each position in the candidate position data is calculated and a position having the shortest distance is selected.

Further, for processing for the next article, the placement-position determination unit 144 stores the selected placement position of the article in temporal-spatial map data in the temporal-spatial map data memory unit 133. For example, as shown in FIG. 10C, the placement-position determination unit 144 stores the placement candidate c in the temporal-spatial map data when the placement candidate c is selected out of the placement candidates a to f as a placement position of the article B3 (however, the article B3 is stored only during the time t1 to t3).

Figure 10D:
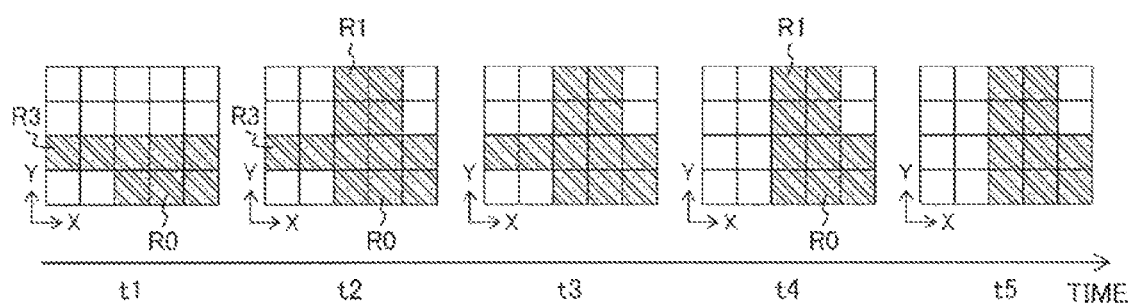
FIG. 10D shows temporal-spatial map data decomposed into the time t1 to t5 and shows placeable positions of the articles after placement of an article B3 is considered.

FIG. 10D shows placeable positions of the article after the placement of the article B3 in the computing space-time is considered. In FIG. 10D, a region R3 in which the article B3 is stored at time t1 to t3 is added to the computing space-time showing the placeable positions of the article shown in FIG. 10B. That is, in FIG. 10D, the region R0, the region R1 and the region R3 are shown by hatching, a region in which the placement of the article is impossible is the region R0 and the region R3 at the time t1, at the time t2 and t3, the abovementioned region is the region R0, the region R1 and the region R3, and at time t4 and 5t, the region in which the placement of the article is impossible is the region R0 and the region R1. At each time, a region without hatching is an available region for a storage region. The placement-position determination unit 144 updates the temporal-spatial map data as shown in FIGS. 10B to 10D as described above.

For a condition for selecting the most appropriate position for a placement position of an article, a condition that does not depend upon another article and a condition that depends upon another article can be given. For example, a condition that an article is placed in the closest position to a gateway is an example of the condition that does not depend upon another article and a condition that an article is placed in the closest position to another article having the same storage period is an example of the condition that depends upon another article. As the same location (the same cell in temporal-spatial map data) is selected as to all articles in placing them when the condition is the former, priority order in which articles are placed may be determined for every cell beforehand.

When the processing in the steps 1203 to 1205 is completed as to all articles, the output control unit 150 outputs placement position data (coordinates of the positions of the articles) stored in the placement-position data memory unit 135 to the input-output device in a step 1207. The placement position data may be output in the shape of numeric values and may be output graphically displayed on a display. For example, it is desirable for a user that such drawings as shown in FIGS. 6A to 6E, FIG. 7 and FIGS. 8A and 8B are displayed on a display. A method is preferable of displaying a placement position of an article at an input date with such drawings as shown in FIGS. 6A to 6E on a display when a user inputs the date via the input-output device 101. Further, a method is also desirable of displaying a placement position of an article in a range of an input date with such drawings as shown in FIG. 7 and FIGS. 8A and 8B on a display when the user inputs the range of the date via the input-output device 101.

In the steps 1203 to 1205, the placement position of the article on or after the date specified by a user can be determined. When the user specifies the date via the input-output device 101, the date is transmitted to the computation device 140 via the input-output interface 110, and the placeable position extraction unit 143 and the placement-position determination unit 144 execute the processing in the steps 1203 to 1206 as to an article having a storage period on or after the date and a storage region having an available period on or after the date. The storage period of the article and the available period of the storage region can be acquired from article data and storage region data. For example, the user inputs a future date, can determine a placement position of only a loaded article on or after the input date, inputs a past date, and can reproduce the placement position of the article from the input past date.

When a placement position of an article is acquired by the method described so far, a smaller region than unit distance and unit time of temporal-spatial map data may remain vacant without being utilized. If the unit distance and the unit time are made shorter, a vacant region can be made smaller. When the unit distance and the unit time are made shorter, there occur a problem that a storage area required for the process is increased and a problem that processing time increases. However, these problems can be avoided by an attempt to change the size of a cell depending upon a location instead of using a plain and simple cell in the temporal-spatial map data. The present invention does not limit a method of representing temporal-spatial map data and it is also included in a scope of the present invention to devise as described above.

The example that the article is placed in the two-dimensional storage region (two-dimensional space) has been described above. In actual placement of an article, there are also a case where such a three-dimensional storage region (three-dimensional space) as that in unloading a part of articles from loading space of a truck and a hold should be considered and a case where a loaded article temporally changes. The device and the method according to the present invention can also be applied to the case where the three-dimensional storage region is considered. Different points from the abovementioned description are as follows.

Placement data including storage region data and article data becomes spatial three-dimensional data and is provided with the spatial three-dimensional data and temporal one-dimensional data such as an available period and a period in which storage is required. Three-dimensional space and a configuration of an object are general in a CAD system and others, and can be realized by utilizing its technique.

The temporal-spatial map data becomes four-dimensional data acquired by combining the temporal one-dimensional data and the spatial three-dimensional data. It is difficult to display four-dimensional temporal-spatial map data on a display. However, when the four-dimensional temporal-spatial map data is stored in the processing device 100 as data, the temporal-spatial map data has only to be represented by four-dimensional array data. A value representing whether each cell (each partial region) of the temporal-spatial map data is available or not is recorded in each array of the four-dimensional array data by the placeable position extracting unit 143.

Further, in the processing for extracting the placeable location of the article in the step 1204, when the storage region is the two-dimensional space, the placeable location of the article is extracted by moving the position of the article in the two directions of the X-axis and the Y-axis. When the storage region is three-dimensional space, a placeable location of an article can be extracted by moving a position of the article in three directions of the X-axis, the Y-axis and the z-axis perpendicular to the X-axis and the Y-axis.

As described above, in the device and the method for processing placement data in this embodiment, a placement position of an article sequentially loaded/unloaded into/from an available storage region that changes with time according to an elapse of time can be determined in time series.

Second Embodiment

In the first embodiment, after the placeable positions of the article are extracted beforehand (in the step 1204 shown in FIG. 9), one placement position is selected out of them (in the step 1205 shown in FIG. 9). In a second embodiment, sequence (priority order) of positions in which each article is preferentially placed is obtained and, afterward, it is determined according to this sequence whether the article can be placed or not, and a position first judged placeable is selected as a placement position. The second embodiment is different from the first embodiment in only this processing.

Figure 11:
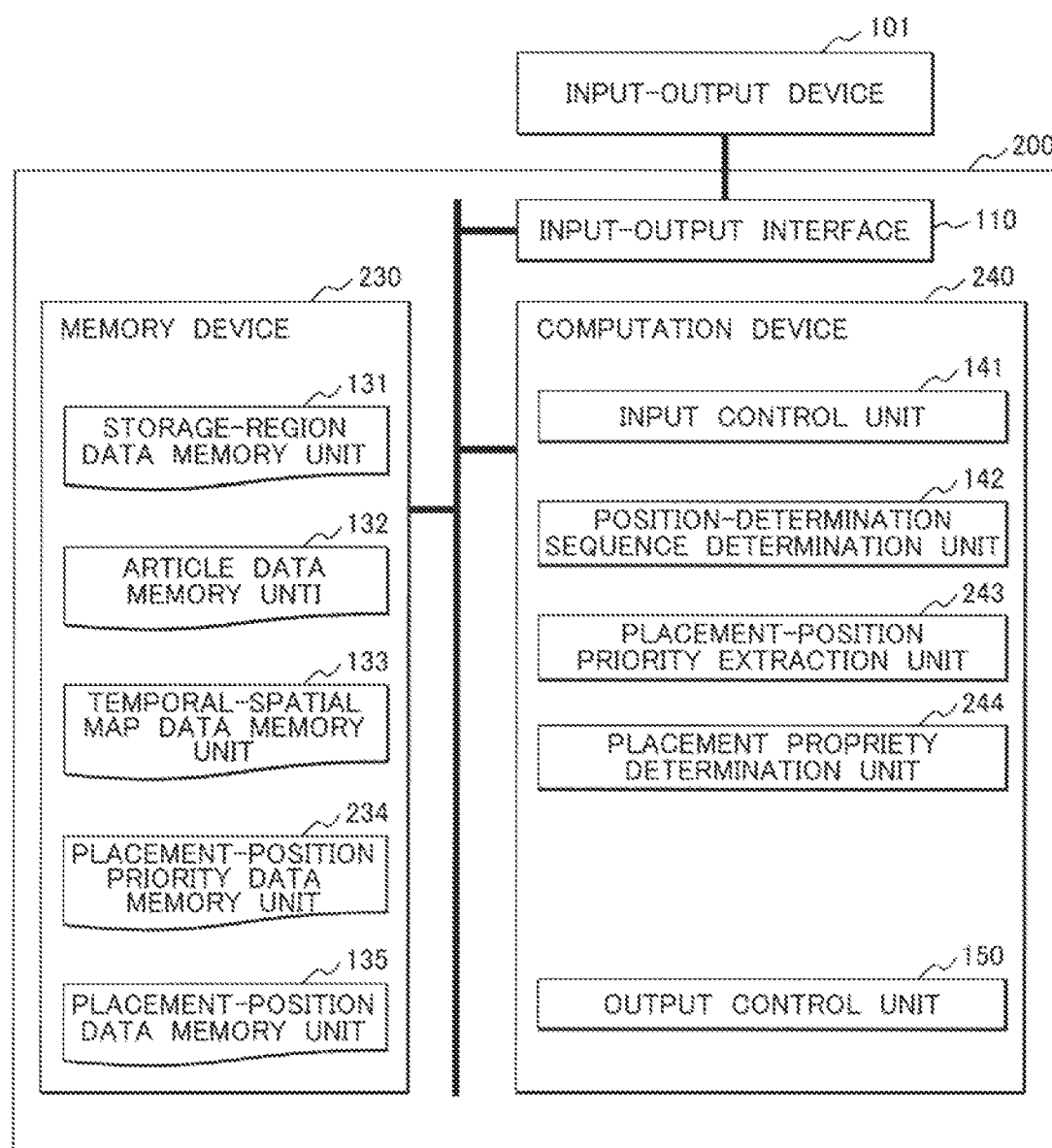
FIG. 11 is a schematic diagram showing a device and peripheral equipment for processing placement data according to a second embodiment of the present invention.

FIG. 11 is a schematic diagram showing a device for processing placement data 200 and its peripheral equipment in the second embodiment of the present invention. In FIG. 11, the same code as that in FIG. 1 denotes the same or a common component as that shown in FIG. 1 and the description of these components is omitted. Only different parts from the parts of the first embodiment will be described below.

The processing device 200 is provided with a memory device 230 and a computation device 240. Although the memory device 130 in the first embodiment is provided with the candidate-position data memory unit 134, the memory device 230 in this embodiment is provided with a placement-position priority data memory unit 234 in place. Further, the computation device 140 in the first embodiment is provided with the temporal-spatial map data memory unit 133 and the candidate-position data memory unit 134. However, the computation device 240 in this embodiment is provided with a placement-position priority extraction unit 243 and a placement propriety determination unit 244 in place.

The placement-position priority data memory unit 234 stores placement-position priority data created by the placement-position priority extraction unit 243 and representing candidates of placement positions of an article and the priority of the placement positions. In this embodiment, since complete propriety of placement is not determined when the placement-position priority data is created, a position that projects from a storage region and a position that interferes with another article may be included in the placement-position priority data.

The placement-position priority extraction unit 243 creates placement-position priority data representing candidates of placement positions of an article and the priority of the placement positions. Concretely, a position for the article to be preferentially placed is sequentially acquired as the candidate of the placement position of the article on the basis of sequence determined by a position-determination sequence determination unit 142 and is stored in the placement-position priority data memory unit 234 together with the priority of the placement position. The placement-position priority extraction unit 243 does not determine whether the target article can be placed without interfering with a region where the article cannot be placed, which is described using FIG. 10C in the first embodiment, but calculates whether the priority of placement is high if the article can be placed for every cell of the temporal-spatial map data, allocates priority to the placement, and the priority is used for the priority of placement positions. The priority allocated to the placement is determined according to sequence determined by the position-determination sequence determination unit 142. When it is inefficient to determine the priority for all cells, the determination of propriety (an interference check) may be made for only a part of cells such as a cell to be a criterion.

Since the same location (the same cell in temporal-spatial map data) may be preceded as to all articles in placing an article when a condition for selecting a placement position of the article does not depend upon another article as described in the first embodiment, priority in which an article is placed may be determined for every cell beforehand. Such additional processing can also be included in the present invention.

The placement propriety determination unit 244 determines whether or not an article can be placed according to priority according to placement-position priority data stored in the placement-position priority data memory unit 234 utilizing temporal-spatial map data stored in a temporal-spatial map data memory unit 133, and when a placeable position is acquired, data representing the position is stored in a placement-position data memory unit 135. The possibility of placement according to priority of an article is determined by placing the article on the temporal-spatial map data according to the priority and judging whether the article can be placed without interfering with a region where the article cannot be placed (that is, the possibility of the placement is determined by the approximately similar method to the method in FIG. 10C in the first embodiment). Further, the placement propriety determination unit 244 reflects an acquired placeable position of the next article for an interference determination process of the next article and updates temporal-spatial map data stored in the temporal-spatial map data memory unit 133 (that is, the placement propriety determination unit updates as shown in FIG. 10D from a state shown in FIG. 10B in the first embodiment).

Figure 12:
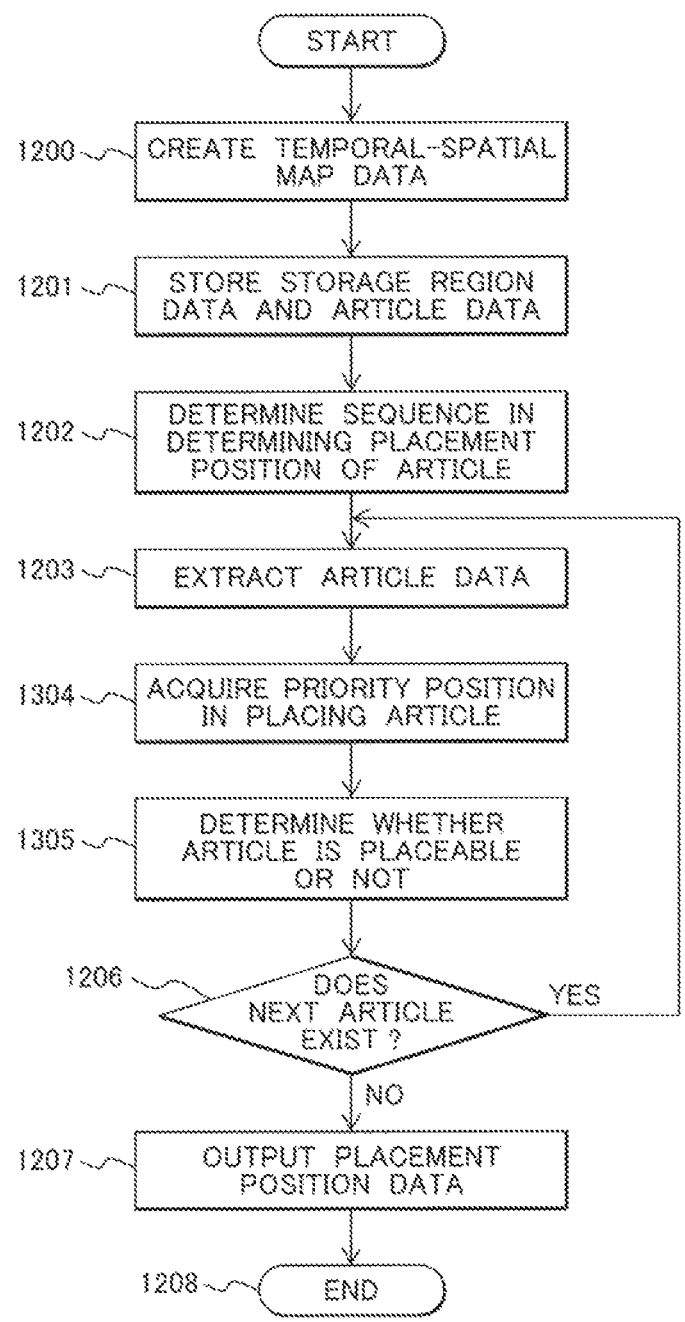
FIG. 12 is a flowchart showing a process executed by the device in the second embodiment.

FIG. 12 is a flowchart showing a process executed by the processing device 200. In FIG. 12, the description of the same step as the step shown in FIG. 9 or a common step to that is omitted. Only different parts from the first embodiment will be described below.

The process flow in this embodiment is different from the process flow in the first embodiment in the extraction of a priority position in placing an article in a step 1304 and the determination of whether the article is placeable or not in a step 1305 instead of the extraction of the placeable position of the article in the step 1204 and the determination of the placement position of the article in the step 1205 in the process flow in the first embodiment.

In the step 1304, the placement-position priority extraction unit 243 sequentially acquires a priority position of the article to be placed on the basis of sequence data determined by the position-determination sequence determination unit 142 and stored in an article data memory unit 132, and stores an acquired result in the placement-position priority data memory unit 234.

In the step 1305, the placement propriety determination unit 244 determines whether or not the article can be placed in order of priority according to the placement-position priority data (position data with priority) stored in the placement-position priority data memory unit 234 utilizing temporal-spatial map data stored in the temporal-spatial map data memory unit 133, and, if the placeable position is acquired, stores data representing the placeable position in the placement-position data memory unit 135. Further, the placement propriety determination unit 244 updates the temporal-spatial map data stored in the temporal-spatial map data memory unit 133, reflecting the acquired placeable position of the article, for an interference determination process of the next article.

As described above, a placement position of a sequentially loaded/unloaded article into/from an available storage region that changes with time according to an elapse of time can also be determined in time series by the device and the method for processing placement data in this embodiment.

Third Embodiment

A method of loading/unloading an article according to an embodiment of the present invention will be described below. In this embodiment, a method of placing an article in a storage region utilizing the device for processing placement data in the first embodiment or in the second embodiment, that is, the method of loading/unloading an article will be described.

Figure 13:
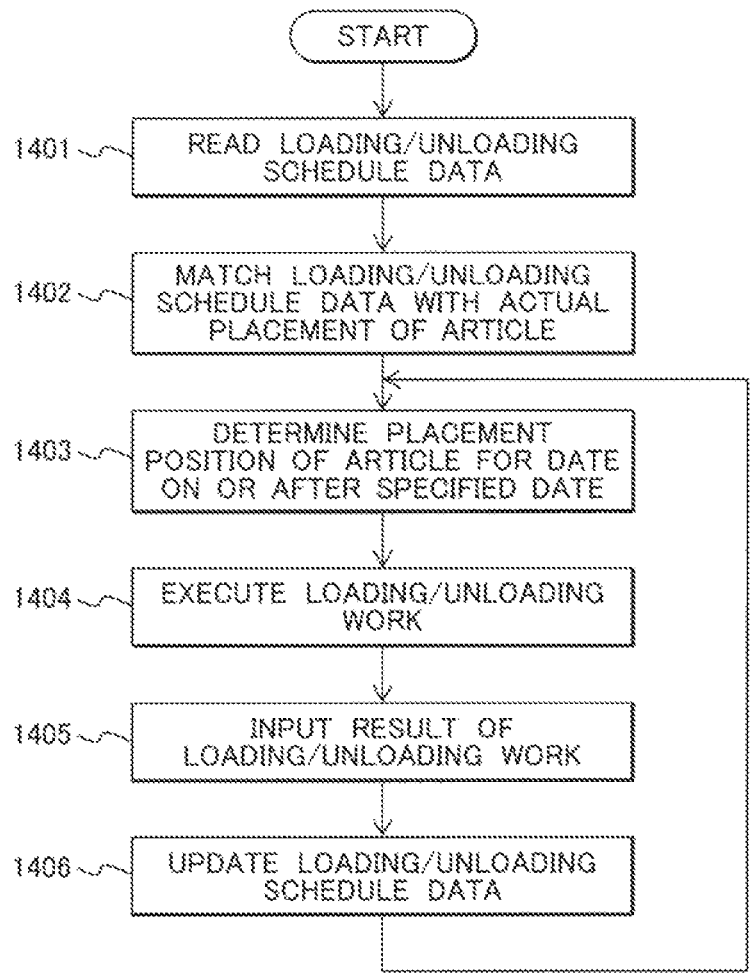
FIG. 13 is a flowchart showing a method for loading and unloading an article according to a third embodiment of the present invention.

FIG. 13 is a flowchart showing the method of loading/unloading an article in this embodiment of the present invention.

In a step 1401, a device for processing placement data reads loading/unloading schedule data. The loading/unloading schedule data includes storage region data of available storage regions and article data of articles the loading/unloading of which is scheduled.

In a step 1402, a user compares the loading/unloading schedule data and actual placement of articles. When the loading/unloading schedule data and the actual placement of the articles are different, the loading/unloading schedule data is changed so as to match it with the actual placement of the articles. The reason is that actual loading/unloading work may be not matched with a schedule and difference is made between the loading/unloading schedule data and the actual placement of articles. For example, in a case where time of loading/unloading is different from a schedule, in a case where the size of an article is different from scheduled size and in a case where a placed position is changed for the convenience of a cargo gear, actual loading/unloading work may not be as scheduled.

In a step 1403, the device for processing placement data determines a placement position of the article as to a date on or after a date specified by the user. For example, the user specifies the current date and can determine a placement position of an article loaded on or after the date. This reason is that as a fact that the article was actually placed in the past cannot be changed, only an article scheduled to be loaded in future can be an object.

For a method of determining a placement position of an article as to a date on or after a date specified by a user, a position of an article already placed before the date specified by the user may be handled as a region not included in a storage region for example. Or for example, when sequence in determining a placement position of an article is determined in the processing by the position-determination sequence determination unit 142 in the computation devices 140, 240, the sequence is made earliest as to the article already placed before the date specified by the user, and when the placement position of the article is selected in the processing by the placement-position determination unit 144, processing may be made so that the already placed article is placed in accordance with the current placement position. Even the already placed article is moved again and the position can be changed. A schedule that the already placed article is once unloaded and is immediately loaded has the same result as changing a position of the already placed article.

In a step 1404, the user executes loading/unloading work on the basis of the placement position of the article determined in the step 1403. When the user prepares directions in which loaded/unloaded articles on that day are described in time series, directions for every article simultaneously loaded/unloaded and others and presents them to an operator, the work can be made efficient.

In a step 1405, the user inputs a result of the loading/unloading work to the device for processing placement data. For example, if the placement position of the article determined in the step 1403 and the actual placement position of the article are different, the user inputs the actual placement position of the article to the device for processing placement data during or after the loading/unloading work and reflects the actual placement position of the article on temporal-spatial map data. The user may input data showing that the loading/unloading of the loaded/unloaded article according to the directions is completed for verification.

In a step 1406, when the loading/unloading schedule data is changed, the device for processing placement data reads the changed loading/unloading schedule data and updates the loading/unloading schedule data. For example, when an available storage region and a loading/unloading schedule of articles are changed, the device for processing placement data reads the change and updates loading/unloading schedule data.

A storage region can be effectively utilized by successively repeating the processing in the steps 1403 to using the device for processing placement data and a man-hour of the loading/unloading work can be reduced. Accordingly, according to the method for loading and unloading articles in this embodiment, the efficient loading/unloading work of articles is enabled.

The present invention is not limited to the abovementioned embodiments and includes various variations. For example, the abovementioned embodiments are described in detail to plainly explain the present invention and the present invention is not necessarily limited to the embodiments provided with all the described configurations.

Further, a part or the whole of each configuration of the processing devices according to the present invention may be realized by hardware by designing with integrated circuits and others for example. Moreover, a part or the whole of these may be realized by software by instructing a processor to interpret and execute a program for realizing respective functions. Information such as a program for realizing each function, a table, a file, measured information and calculated information can be recorded in a recording device such as a memory, a hard disk and a solid-state drive (SSD) or on a record medium such as an IC card, an SD card and DVD. Therefore, the function of each configuration of the processing devices according to the present invention can be realized as a processor, a processing unit, a program module and others.

In addition, a control line and an information line which are respectively considered necessary for explanation are shown in each drawing and all control lines and all information lines respectively necessary for a product are not necessarily shown. In an actual product, it may be considered that substantially all components are mutually connected.

EXPLANATION OF REFERENCE CHARACTERS

100, 200—Device for processing placement data,
101—Input-output device,
110—Input-output interface,
130, 230—Memory device,
131—Storage-region data memory unit,
132—Article data memory unit,
133—Temporal-spatial map data memory unit,
134—Candidate-position data memory unit,
135—Placement-position data memory unit,
140, 240—Computation device,
141—Input control unit,
142—Position-determination sequence determination unit,
143—Placeable position extraction unit,
144—Placement-position determination unit,
150—Output control unit,
234—Placement-position priority data memory unit,
243—Placement-position priority,
244—Placement propriety determination unit,
A1, A2—Storage region,
B1, B2, B3, P1, P2, P3, P4—Stored article,
R0—Region not included in storage region,
R1—Region where article B1 is stored,
R2—Region where article B2 is stored,
R3—Region where article B3 is stored.

What is claimed is:

1. A device for processing placement data, comprising:
an article data memory unit that stores article data including a configuration and a storage period of an article;
a storage-region data memory unit that stores storage region data including a shape of a storage region where the article is placed;
a temporal-spatial map data memory unit that stores temporal-spatial map data showing positions of the article and the storage region in space-time specified by a user; and
a computation device that creates the temporal-spatial map data and acquires a placement position of the article in time series in the storage region using the article data, the storage region data and the temporal-spatial map data; wherein
the device for processing placement data is connected to an input-output device;
the article data memory unit stores the article data input via the input-output device;
the storage-region data memory unit stores the storage region data input via the input-output device;
the computation device includes:
a position-determination sequence determination unit that determines sequence of the article for deciding a placement position on the basis of the article data;
a placeable position extraction unit that creates the temporal-spatial map data and searches a placeable position of the article in the storage region in time series according to the sequence of the article using the article data, the storage region data and the temporal-spatial map data;
a placement-position determination unit that acquires a placement position of the article out of placeable positions of the article in time series according to the sequence of the article on the basis of a condition specified by a user, and records an acquired placement position of the article in time series on the temporal-spatial map data; and an output control unit that outputs the acquired placement position of the article in time series to the input-output device; and the placeable position extraction unit searches a position in time series in the storage region as a placeable position of the article in the storage region, the searched position being a position where no other article is placed during the storage period of the article for deciding the placement position.

2. A method of processing placement data, comprising the step of:

storing article data including a configuration and a storage period of an article in a memory device;

storing storage region data including a shape of a storage region where the article is placed in the memory device;

creating temporal-spatial map data showing positions of the article and the storage region in space-time specified by a user by a computation device;

acquiring a placement position of the article in time series in the storage region using the article data, the storage region data and the temporal-spatial map data by the computation device; and determining sequence of the article for deciding a placement position on the basis of the article data by the computation device, wherein, in the step of acquiring a placement position, the computation device searches a position in the storage region in time series according to the sequence of the article using the article data, the storage region data and the temporal-spatial map data as a placeable position of the article in the storage region, the searched position being a position where no other article is placed during the storage period of the article for deciding the placement position; and the computation device acquires the placement position of the article out of placeable positions of the article in time series according to the sequence of the article on the basis of a condition specified by a user, and the method further comprising the steps of:

recording the acquired placement position of the article in time series on the temporal-spatial map data by the computation device; and outputting the acquired placement position of the article in time series to an input-output device by the computation device.

\* \* \* \* \*